United States Patent [19]
Perry et al.

[11] Patent Number: 5,957,119
[45] Date of Patent: *Sep. 28, 1999

[54] PNEUMATIC VALVE AND REGULATOR

[75] Inventors: Roderick A. Perry, Greensburg; William M. Gardner, Jr., Ligonier, both of Pa.

[73] Assignee: Smart Parts, Inc., Loyalhanna, Pa.

[*] Notice: This patent is subject to a terminal disclaimer.

[21] Appl. No.: 09/028,705

[22] Filed: Feb. 24, 1998

Related U.S. Application Data

[63] Continuation-in-part of application No. 08/506,183, Jul. 25, 1995, Pat. No. 5,755,213.

[51] Int. Cl.$^6$ ...................................................... F41B 11/00
[52] U.S. Cl. ..................... 124/73; 137/68.23; 137/234.5; 137/468; 137/505.42
[58] Field of Search ........................... 124/73; 137/68.23, 137/234.5, 468, 505.42

[56] References Cited

U.S. PATENT DOCUMENTS 5,755,213  5/1998  Gardner, Jr. et al. ..................... 124/73

Primary Examiner—J. Woodrow Eldred
Attorney, Agent, or Firm—Titus & McConomy LLP

[57] ABSTRACT

A pneumatic valve and regulator, and more particularly to a pneumatic valve and regulator used in a compressed gas powered gun system which is designed to project a fragile liquid-containing spherical unit which bursts upon impact with the intended target. The regulator possesses a pressure balancing device, a temperature compensating device, and relief valve features. The temperature compensator of the temperature compensating device is made of a synthetic compound material which expands and contracts at a rate that equals but is inverse to the rate of change caused by changes in the modulus of elasticity of a helical compression spring caused by a temperature differential. The valve possesses a seal made of pressure-activated material, the outer diameter of the seal is mechanically captured, the inner diameter of the seal is not constrained from moving into the cavity. The application of pressure the initiates flow characteristics of the seal at the interface of the inner diameter of the seal and the outer diameter of the poppet. This sealing technique has inherent lubricity, is self-healing, is non-temperature sensitive, and is compatible with all noble gases used.

21 Claims, 5 Drawing Sheets

PNEUMATIC VALVE AND REGULATOR

This application is a continuation-in-part of Ser. No. 08/506,183 filed Jul. 25, 1995, now U.S. Pat. No. 5,755,213.

FIELD OF THE INVENTION

The field of invention relates to the construction of a pneumatic valve and regulator, and more particularly to a pneumatic valve and regulator used in a compressed gas powered gun system which is designed to project a fragile liquid-containing spherical unit which bursts upon impact with the intended target.

BACKGROUND OF THE INVENTION

Pneumatic valves and regulators have been used in a variety of contexts including windshield wipers, brakes, fluid spraying devices and marking guns. It is desirable to have a constant pressure source when operating such pneumatically powered devices so that the devices will operate predictably.

The standard unbalanced regulator suffers from a phenomena known to those skilled in the art as "droop", i.e., the cylinder filled with pressurized air set at a pre-set regulated pressure has pressure fluctuations within the cylinder such that as one moves away from the source of input pressure, the pressure curve inside the cylinder deteriorates. In an attempt to alleviate the effects of this fluctuation, the pre-set regulated pressure often must be set at a level within a band that encompasses the desired output pressure. Furthermore, the overall effect of having a band over which the output pressure will be released, coupled with the pressure curve deterioration, means that most regulators can use effectively only 65 percent or less of the cylinder volume.

Additionally, many of the pneumatically operated devices are used under conditions that provide for variations in the ambient temperature which affect the pressure of the gas in an output chamber.

In contrast, the regulator described in the present invention is balanced, and thus maintains a constant flow of pressurized gas into the pressure output chamber which does not reflect variations of input pressure. The pre-set regulated output pressure is maintained constant for the full volume of the cylinder. Furthermore, the regulator described in the present invention incorporates a temperature compensating device and has integrated pressure relief valve features which provide for even greater accuracy in ensuring constant output pressure.

One of the many applications of the present invention involves it use in marking guns. Marking guns have been used for wildlife management and in strategic or tactical games such as paintball games. Paintball war games have become a popular recreational sport. To avoid injury, organizers of paintball war games often dictate that paintballs fired from paintball guns shall not exceed a set velocity. Accordingly, it is advantageous for paintball players to use guns that emit paintballs at a velocity that approaches the upper limit of the set velocity without exceeding that limit. Thus, manufacturers of paintball guns have attempted to design paintball guns that will apply a consistent force to paintballs so that they can be more accurately and consistently fired. Many paintball guns are gas-powered. Thus, maintaining a gas pressure at a pre-determined pressure provides for consistent operation of the paintball gun.

Most paintball games are played outdoors where there can be wide variations in the ambient temperature. Because temperature changes can affect gas pressure, changes in the temperature in the geographic area in which the paintball game is played may cause changes in the velocity with which the paintballs are fired from the paintball guns. Furthermore, leaks may occur which affect the pressure applied to the paintball in the firing chamber.

Some paintball guns have attempted to provide for such temperature variations with a screw threaded into a tubular bolt through which the gas flows to power the paintballs. By adjusting the amount the bolt is screwed in, the pressure applied to the paintball can be adjusted. This regulating mechanism is awkward, imprecise and permits adjustment for only a limited range of temperature and velocity variations.

Other paintball guns have multi-port plugs that are rotated to ports of varying sizes that permit regulating the amount of gas flowing to the paintball by regulating the size of the port through which such gas flows. Unfortunately, this regulating mechanism can accommodate a limited range of temperature and velocity variations.

U.S. Pat. No. 5,383,442 (Tippmann), U.S. Pat. No. 5,333,594 (Robinson), and U.S. Pat. No. 5,280,778 (Kotsiopoulos) disclose gas-powered paintball guns. However, none of these references disclose a paintball gun with the pneumatic valve and regulator described in the present invention. Thus, paintball guns that incorporate the present invention will operate more consistently and with greater efficiency than currently available paintball guns. For example, paintball guns using standard regulators typically can achieve approximately 1100 to 1200 shots from a standard pressure source. Because the current invention is effective over a broader band of output pressures, the regulator and valve disclosed herein can achieve 1600 shots using the same pressure source.

It is an object of the present invention to provide a unique sealing technique that provides for a better pneumatic valve.

It is further object of the present invention to provide an integrated pressure relief valve in a regulator.

It is an object of the present invention to provide a regulator having temperature compensating features, relief valve features and pressure balance features.

It is a further object of the present invention to provide a regulator having a temperature compensating device which includes a temperature compensator that is made of a synthetic compound material which expands and contracts at a rate that is inverse to an equals the rate of change caused by changes in the modulus of elasticity of a helical compression spring caused by a temperature differential.

It is also an object of the present invention to provide a paintball gun system that can supply a steady source of pressure on the paintball to be ejected from the paintball gun.

Another object of the invention is to provide a paintball gun system that accurately and efficiently projects paintballs under a variety of atmospheric conditions.

Other objects and advantages of the present invention will become apparent from perusing the following detailed description of presently preferred embodiments taken in conjunction with the accompanying drawings.

DETAILED DESCRIPTION OF THE PREFERRED EMBODIMENTS

Figure 1:
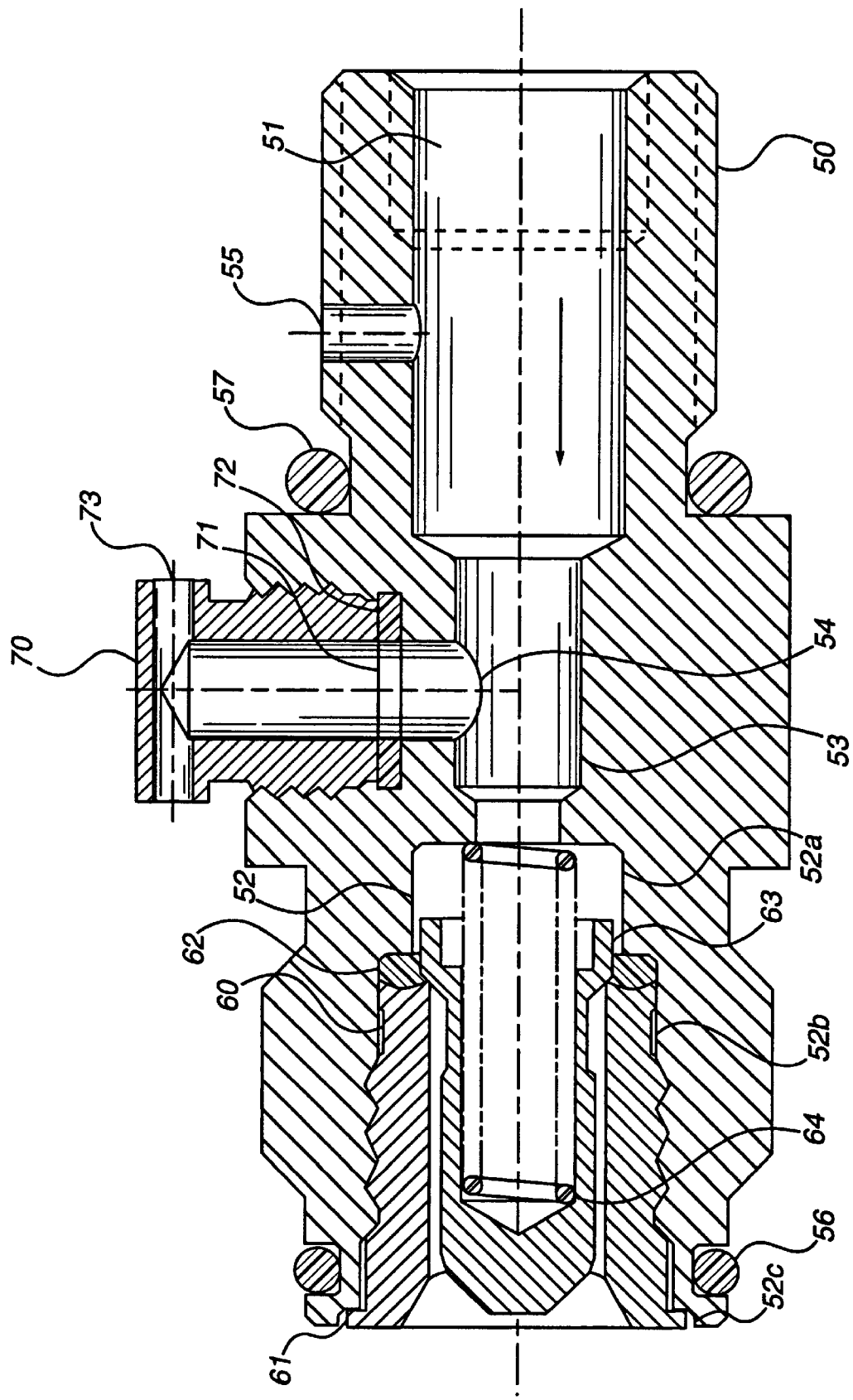
FIG. 1 is a cross section of the pneumatic valve.
Figure 2:
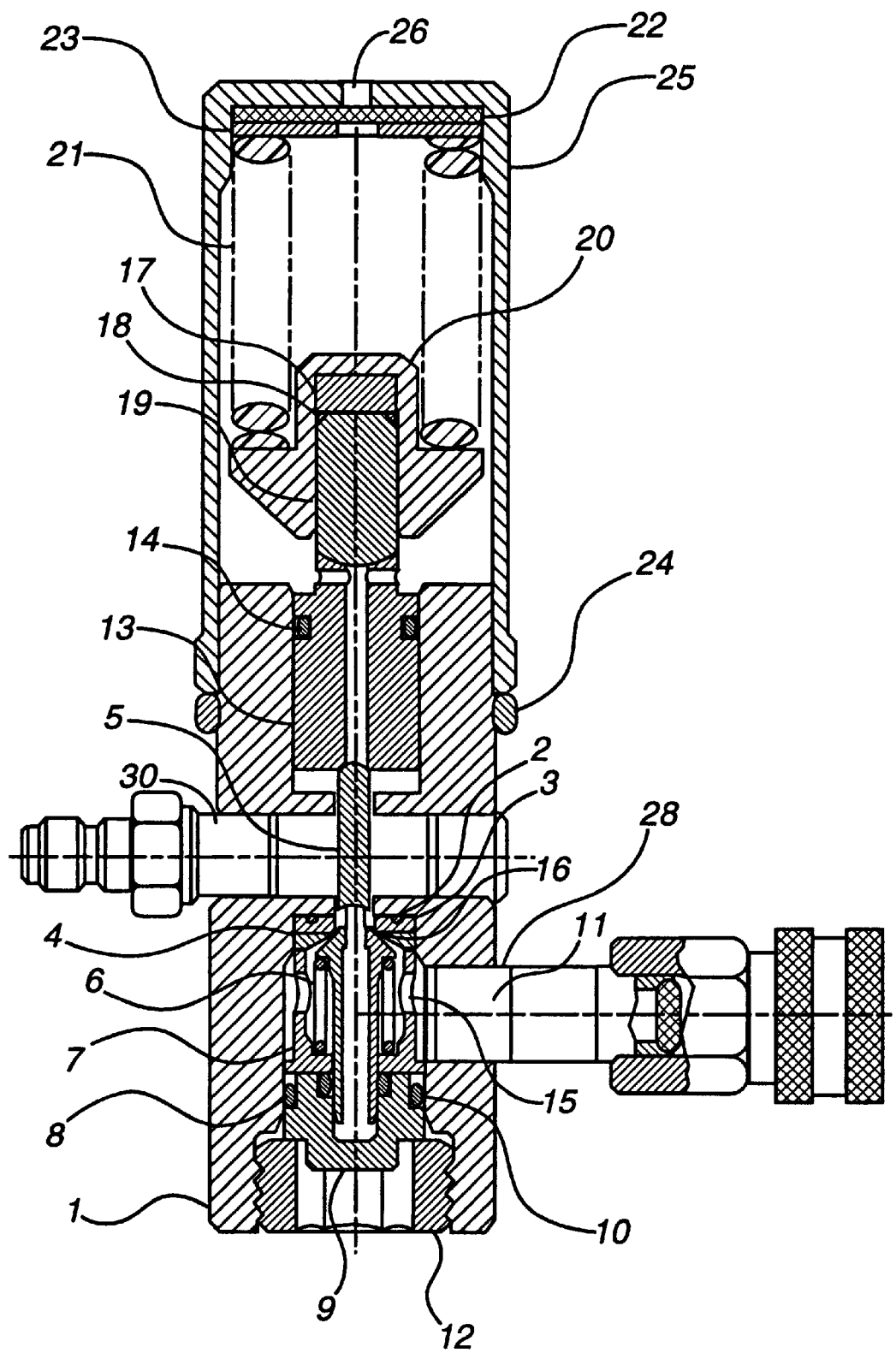
FIG. 2 is a cross section of the pneumatic regulator in a ready to fire position.
Figure 3:
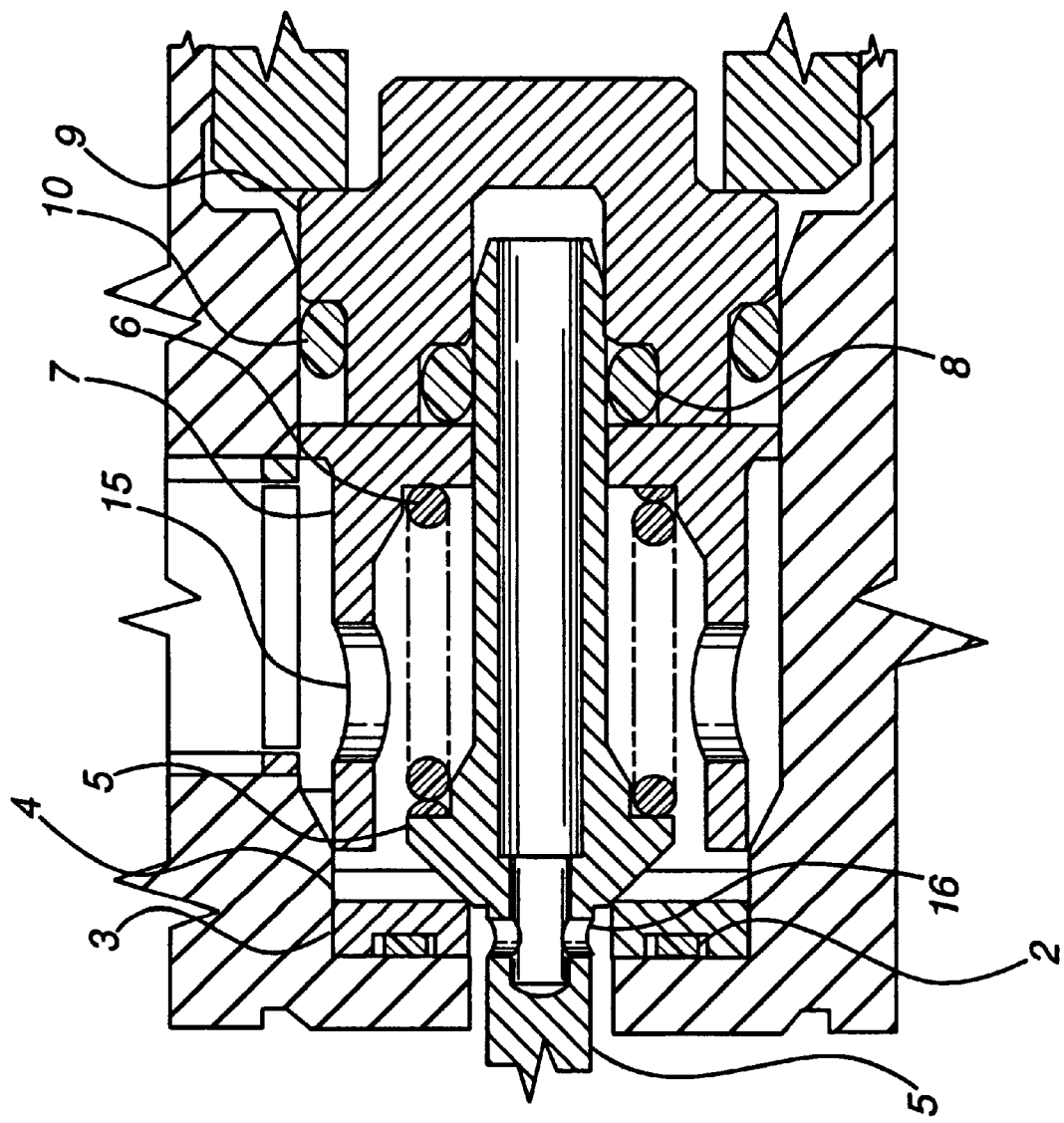
FIG. 3 is an enlarged detail of the cross section of the pressure balancing components of the pneumatic regulator in a ready to fire position.
Figure 4:
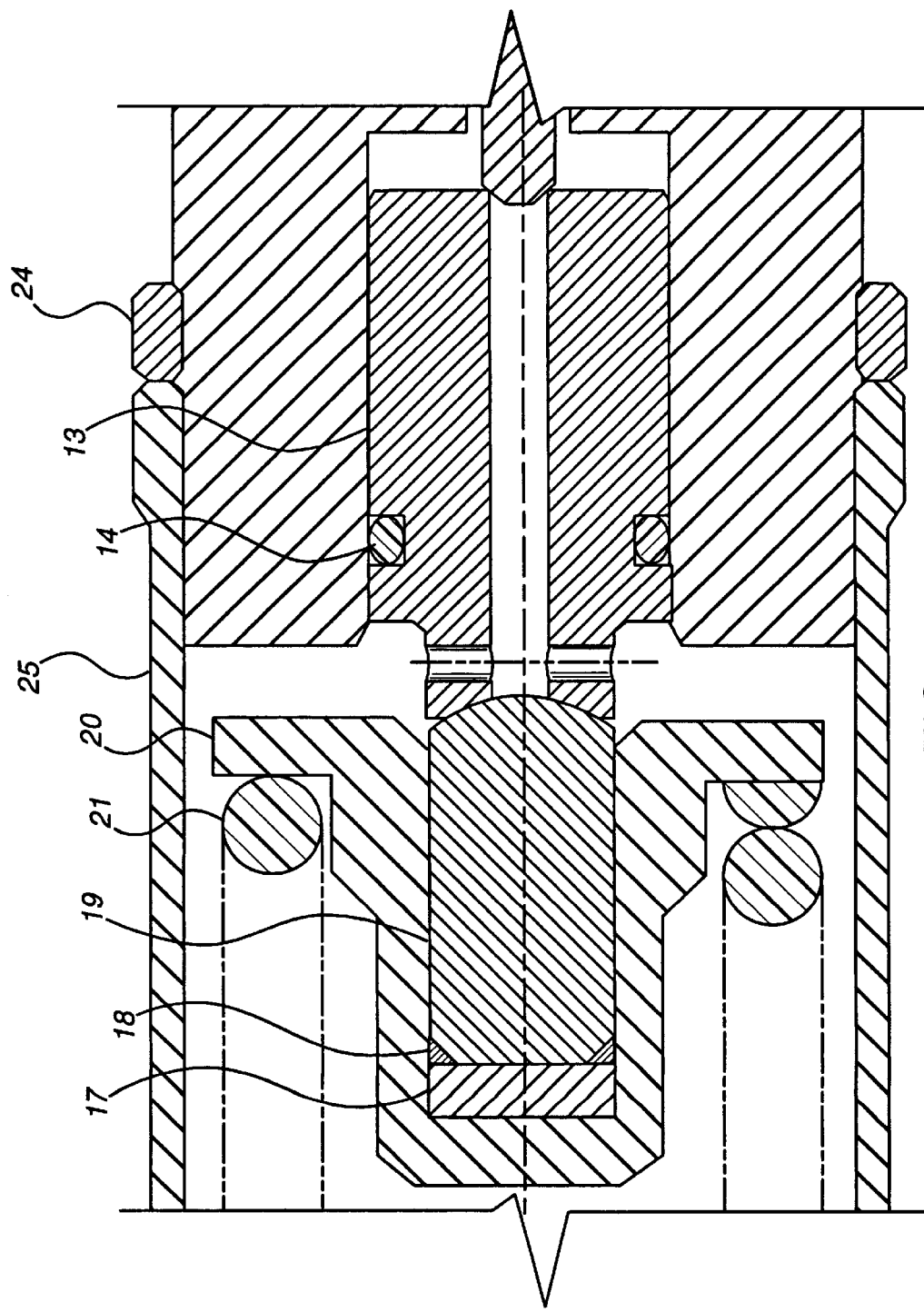
FIG. 4 is an enlarged detail of the cross section of the temperature compensator and sensing piston of the pneumatic regulator.

FIG. 1 shows a pneumatic valve. FIGS. 2–4 show the pneumatic regulator. The regulator comprises a series of connected passageways that extend from the first end of the regulator to the second end of the regulator and which are gated at various points by various components housed therein. The regulator body 1 is generally externally cylindrical in shape with an interior that is molded to form a nest for the components housed therein and to create passageways that house the gas at the pre-set regulated pressure.

The wall of the regulator body has at least two ports that traverse the thickness of regulator body's wall. The first end of a first port, the inlet port 11, opens into a space between the interior regulator body wall and the exterior wall of a first spring seat 7. The second end of the inlet port opens to the atmosphere. The wall of the second end of the inlet port is threaded and mates with threads presented by a nipple assembly 28. A threaded first end of the nipple assembly is mated with the threads in the inlet port of the regulator body wall and the nipple assembly is thereby secured to the regulator body. An input pressure source is affixed to the second end of the nipple assembly.

The second port serves as an outlet port 30. In one embodiment, a second port traverses the diameter of the regulator body and extends from a first point on the exterior wall of the regulator body to a second point on the exterior wall of the regulator body that is directly opposite to the first point. The first end of the second port may be threaded to permit securing a mechanism by which the regulator will be attached to a pneumatically powered device. In the paintball gun application of the invention, the first end is threaded to permit attachment either directly or indirectly, as through a hose or other manifold, to the paintball gun. The second end of the second port may be threaded to mate with threads presented by a plug, but in either event, the non-output end of the second port must be closed.

Within the regulator body 1, in a first passageway located at the regulator body's first end, is a regulator seat 3 which preferably is made of a hard synthetic material that exhibits a minimal amount of yield. The regulator seat has an opening in its center to allow a regulator poppet 5 to pass through the regulator seat. A first face of the regulator seat 3 rests against a step in the shaped interior wall of the regulator body. The exterior wall of the regulator seat also is notched to accommodate a regulator seat seal 2 which preferably is made of a plastic material. The regulator seat seal 2 secures the regulator seat to the regulator body. The regulator seat is further supported in the regulator body 1 by a seat support 4. The regulator seat support preferably is made of a material such as brass, that exhibits even less yield than the regulator seat.

The regulator seat support communicates with and forms a friction seal with a first end of a first spring seat 7. The first spring seat also serves as an O-ring retainer at the second end of the spring seat. The first spring seat is essentially a hollow cylinder having a completely open first end and at its second end having a circular base with an opening in its center that is just large enough to allow the regulator poppet tail to pass through to a poppet guide 9 which is within the same first passageway but exterior to the first spring seat. A pediment lip extends out from the exterior surface of the first spring seat to the interior walls of the regulator body. The exterior surfaces of the first spring seat do not communicate with the interior surfaces of the regulator body except where the exterior wall of the first end of the first spring seat contacts the seat support and at the second end of the first spring seat where the pediment lip extends out from the exterior wall of the first spring seat to the regulator body.

Figure 5:
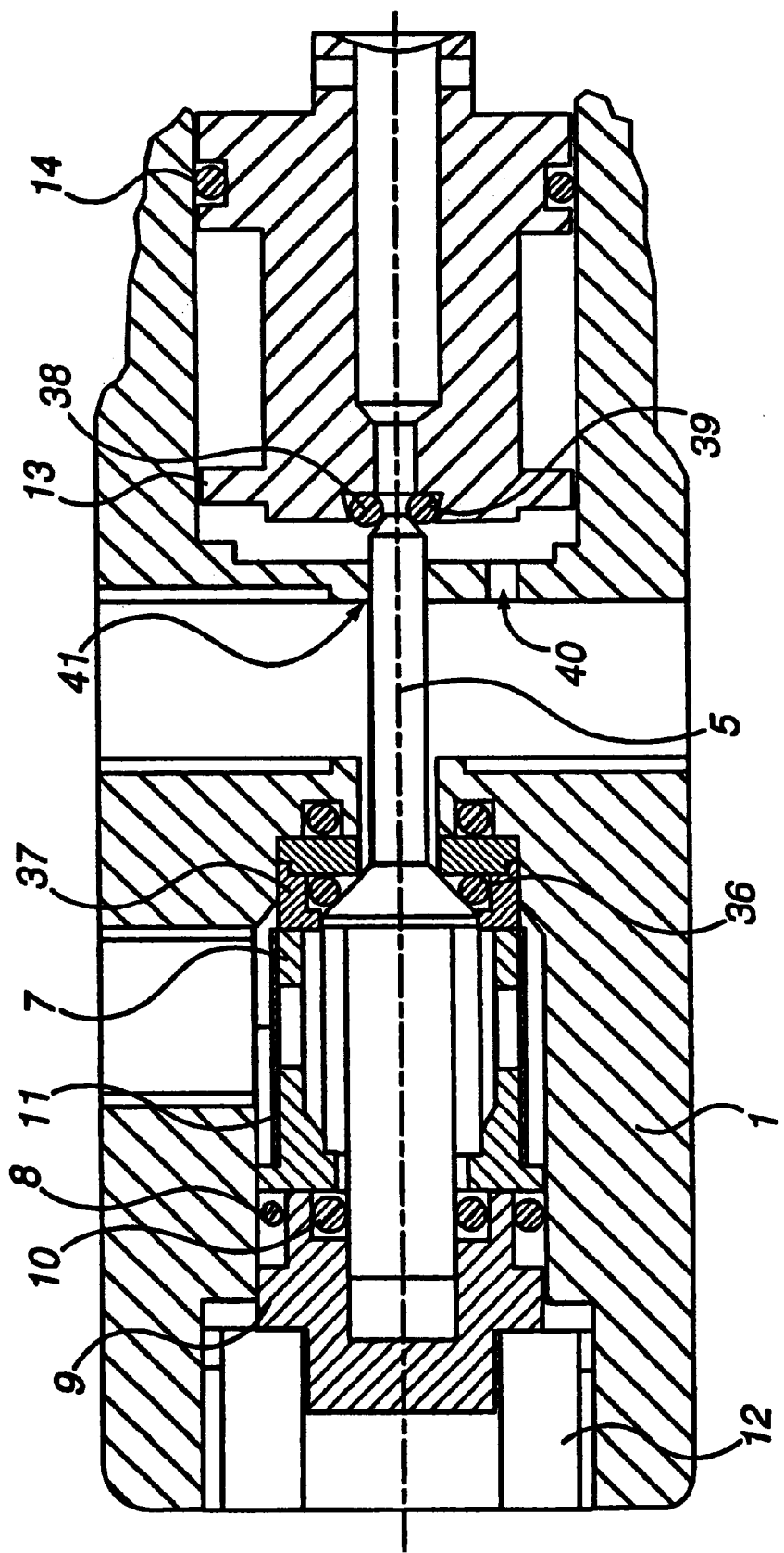
FIG. 5 is a cross section of the pneumatic regulator configured with flexible O-rings to mate with the sealing surfaces of the regulator poppet.

As shown in FIG. 5, in lieu of a hard regulator seat 3, the regulator body may alternately include an O-ring 36, preferably formed of a material such as urethane, to eliminate leakage by creating a flexible seal with the regulator poppet 5. The O-ring 36 is contained within a housing 37 designed to hold the O-ring 36 in place and to minimize its contact area with the regulator poppet 5. The use of a flexible O-ring 36 in lieu of the hard regulator seat 3 eliminates leakage caused by the effect of regulator seat 3 tolerances on a misalignment of the regulator poppet 5 within the poppet guide 9. Additionally, the use of a flexible material for O-ring 36 (which returns to its original shape after being distorted by the application of a load) eliminates the problem caused by the tendency of the hard regulator seat 3 material to remain distorted after being placed under a load. Finally, in combination with the use of a metal-to-metal landing area between regulator poppet 5 and O-ring housing 37, guide area 41 minimizes the potential for misalignment of the regulator poppet 5 within the poppet guide 9 by allowing the regulator poppet 5 to consistently find its way home when re-seating.

Thus, a space exists between the first spring seat and the regulator body which space is bracketed at either end by the tangential contact at the first spring seat's first end and the contact of the pediment lip at the first spring seat's second end. Furthermore, two ports 15 and 15' (15' not shown) are bored through the wall of the spring seat perpendicular to each other. Preferably, the ports are located on the same latitude of the spring seat, are equidistantly spaced apart, and the ports have the same diameter. Thus, the space between the spring seat and the regulator body is connected by the ports to the interior chamber of the first spring seat.

The exterior wall of the circular base of the first spring seat forms a friction seal with a poppet guide 9. The poppet guide 9 has a substantially U-shape that forms an interior chamber which is open at its first end. The interior chamber formed by the U-shape is symmetrical and, with the exception of a notched area on the interior wall, has a diameter that is just sufficiently large enough to accommodate the sliding of the poppet in and out of the interior chamber cavity. A second end of the regulator poppet 5, the poppet tail, extends through the open first end of the poppet guide into the interior cavity of the poppet guide. The interior wall of the poppet guide is notched at its first end to permit insertion of a first O-ring 8 that further secures and guides the poppet tail into the poppet guide. Thus, the poppet tail slidably engages the poppet guide and first O-ring. The first O-ring is one of the pressure balancing features of the regulator. The exterior wall of the first end of the poppet guide is notched to permit a second O-ring 10 to form a seal between the poppet guide and the regulator body and secure the poppet guide in the regulator body. Preferably, the first and second O-rings are elastomeric.

The exterior wall of the second end of the poppet guide is notched to permit the nesting of a pair of threaded retaining nuts 12 between the interior wall of the regulator body and exterior wall of the poppet guide. The interior wall of the regulator body is threaded and threads on the exterior wall of the retaining nuts mesh with those presented by the interior wall of the regulator body. The threaded retaining nuts 12 are designed to receive screws that would secure the poppet guide, the first spring seat, the seat support, the regulator seat and all the components included therein, including the O-rings, in the first passageway of the regulator body 1.

Within the interior chamber of the first spring seat is a first helical compression spring 6. The first helical compression spring encircles the portion of the regulator poppet located within the first spring seat. The first spring seat has openings at its first and second ends through which the regulator poppet extends. The regulator poppet has a first end, the poppet stem, and a second end, the poppet tail. The poppet tail moves within the channel created by the alignment of the regulator seat, the seat support, the first spring seat, and the poppet guide. Preferably, the poppet tail is hollow so that the overall poppet weight is reduced. The internal cavity of the poppet tail may narrow at the portion of the poppet that traverses the opening in the regulator seat. The poppet may also possess two sets of ports 16 and 16' (16' not shown) that are bored perpendicular to each other across the diameter of the poppet, are located on the same latitude of the poppet, and extend across the internal cavity of the poppet. These poppet ports and the first O-ring remove the effects of inlet pressure variation on the poppet-spring seat interface. Thus, the regulated output pressure is dictated solely by a spring-loaded pressure sensing mechanism located downstream in the regulator.

The poppet tail has a generally cylindrical shape but flares outwardly and then inwardly at the portion of the poppet tail located within and at the first end of the first spring seat. The inwardly flared portion of the poppet tail is beveled sharply such that the inwardly bevelled portion of the poppet tail makes angular contact with just the interior corners of the opening of the regulator seat and forms a seal therewith when in the closed position. The regulator seat prevents the poppet from moving in a rearward direction beyond the closed position. The outwardly flared portion of the poppet tail is notched to provide a flat connecting surface for a first helical compression spring 6.

A first helical compression spring 6 encircles a portion of the regulator poppet tail. The first end of the first helical compression spring 6 is attached to the interior wall of the first spring seat 7. The second end of the first helical compression spring is attached to the notched portion of the outwardly flared portion of the poppet tail.

The poppet stem extends into a second passageway of the regulator body formed by the second port bored across the diameter of the regulator body. The stem further extends through a narrow opening in the interior wall of the regulator body and into a third passageway go substantially filled by a regulator sensing piston 13. The regulator sensing piston 13 has an interior cavity that runs the length of the sensing piston. The end of the stem of the regulator poppet is bevelled and in the closed position, angularly rests against corners formed at the first end of the sensing piston by the sensing piston's interior cavity. In the closed position, a space exists in the passageway substantially filled by the sensing piston between the first end of the sensing piston and the shaped part of the regulator body that forms the narrow opening through which the poppet stem extends. The exterior wall of the sensing piston is notched such that a third O-ring 14 securely fits within such notched area to attach the sensing piston to the interior wall of the regulator body 1. Preferably, the third O-ring is elastomeric. The third O-ring 14 acts as a sealing device which allows detection of pressure differentials and operates as a relief valve feature. When the sensing piston moves away from the poppet, it depresses a second helical compression spring 21 and allows gases to escape.

As shown in FIG. 5, in lieu of configuring the interface between the sensing piston 13 and regulator poppet 5 to form a seal between the bevelled end of the regulator poppet 5 and the corner of the first end of the sensing piston 13, the sensing piston 13 may alternately include an O-ring 38, preferably formed of a material such as urethane, to eliminate leakage by creating a flexible seal with the bevelled end of regulator poppet 5. The O-ring 38 is contained within a housing 39 designed to hold the O-ring 38 in place. The use of a flexible O-ring 38 in lieu of the hard corner of the sensing piston 13 eliminates leakage caused by a misalignment of the regulator poppet 5 within the poppet guide 9. Additionally, the use of a flexible material for O-ring 38 ensures that the O-ring 38 will return to its original shape after being distorted by the application of a load. One or more bleed holes 40 may be provided in the regulator body to allow flow to the sensing piston 13.

The second end of the sensing piston has a stepped-down diameter so that the second end of the sensing piston securely fits into a narrow opening formed by the interior wall of the regulator body. The portion of the sensing piston having a narrow diameter extends outside the regulator body and may possess two sets of ports that are bored perpendicular to each other, are located on the same latitude of the piston and traverse the internal cavity of the piston.

The regulator cover 25 is substantially in the shape of a cylinder with a first open end and a second end with a circular base cover that extends to the walls of the cylinder. The interior wall of the regulator cover is threaded at its first end. The threads of the regulator cover are mated with threads that are presented by the exterior wall of the second end of the regulator body. After the regulator cover is threaded onto the regulator body, the regulator cover is secured in its position on the regulator body by a pair of regulator locknuts 24 that are positioned on the exterior surface of the regulator body. The circular base of the regulator cover 25 has an opening 26 in the center of such base that has a large enough diameter to allow gases to escape when the relief valve is activated. The regulator body is inserted in the cavity formed by the regulator cover. The exterior surface of the regulator cover is exposed to the atmosphere. The interior surface of the regulator cover forms a chamber with the exterior surface of the second end regulator body. The temperature compensating components are housed within the chamber formed by the regulator cover and the regulator body.

The second end of the sensing piston rests against a first end of a retainer 19 for a temperature compensator 17. The second end of the retainer 19 communicates with the temperature compensator 17 and is bevelled such that an anti-extrusion ring is securely fitted between the retainer and temperature compensator. Because it is difficult if not impossible to achieve a square shoulder between the retainer and the temperature compensator, the anti-extrusion ring acts to create a better seal between the retainer and temperature compensator and to prevent the temperature compensator from trying to expand into a space between the retainer and the interior wall of the second spring seat. Such uncontrolled and unbalanced expansion of the temperature compensator would result in a loss of elasticity of the temperature compensator. Thus, the anti-extrusion ring prevents the temperature compensator from losing shape and elasticity.

In one embodiment, the anti-extrusion ring is a delta shaped polytetrafluoroethylene ring.

The temperature compensator 17, the retainer for the temperature compensator 19 and the anti-extrusion ring 18, substantially fill and are encased by an interior chamber of the second regulator spring seat 20. The exterior wall of the second regulator spring seat is flared at its first end and extends almost to the wall of the regulator cover 25. The flared portion of the second regulator spring seat is substantially flat on its upper surface. A first end of a second helical compression spring 21 is attached to spring seat. The second end of the second regulator spring seat. The second end of the second helical compression spring is attached to a third spring seat 23 which has an opening in the center of it and preferably is a washer made of sintered material. Preferably, the second helical compression spring is a steel spring. A thin circular filter element 22 that prevents particulates from the ambient atmosphere from entering the regulator, is positioned between the interior surface of the base of the regulator cover and the circular third spring seat, and substantially fills the space between the interior surface of the base of the regulator cover 25 and the third spring seat.

The temperature compensator 17 preferably is made of a synthetic compound material, such as silicon rubber, which expands and contracts at a rate that equals the rate of change caused by changes in the modulus of elasticity of the second helical compression spring caused by a temperature differential. Thus, when the ambient temperature cools, the second helical compression spring contracts and the temperature compensator expands such that the force maintained on the sensing piston remains constant. Similarly, when the ambient temperature warms, the second helical compression spring expands and the temperature compensator contracts to maintain a constant force on the sensing piston. Thus, the temperature compensator coupled with the anti-extrusion ring, ensure that the second helical spring will apply a constant force to the sensing piston.

The pre-set outlet pressure is dictated by the force of the second helical compression spring on the sensing piston. The input pressure enters the regulator through the nipple assembly and then enters the chamber in the spring seat where variations in input pressure are modulated by the sealing of the chamber off from the atmosphere and operation of the first and second O-rings. When the pressure in the pressure output chamber drops below the pre-set output pressure, which pressure is set by the force of the second helical compression spring on the sensing piston, the pressure sensing piston moves forward, the seal formed by the poppet resting against the corners of the interior wall of the piston cavity is broken, and pressurized air travels up the interior cavity of the sensing piston and is released into the passageway formed by the regulator body and the regulator cover. Air also may flow out into the atmosphere through the hole in the base of the regulator cover.

In one preferred embodiment, the regulator operates to maintain the pressure in the output pressure chamber at approximately 450 psi. A pressurized source of carbon dioxide may be used to generate the 450 psi output pressure. In another preferred embodiment, the regulator operates to maintain the pressure in the output pressure chamber at approximately 1000 psi. The second helical compression spring, second regulator spring seat and the temperature compensator are modified slightly to accommodate the different input and output pressures.

In other preferred embodiments, the pressure sensing mechanism, described above as regulator sensing piston, can assume a variety of forms including a non-metallic diaphragm, a metallic diaphragm, a bellows, or a back-filled capsule.

FIG. 1 shows a pneumatic valve. The pneumatic valve housing 50 is generally cylindrical in shape with a protrusion for a safety port. The valve includes an inlet port, an outlet port, a transfer port, a safety port, a relief port, a poppet retainer, a helical spring, and a poppet and a shaped plastic seal that together act as a gate.

The outlet port 52 is located in the first end of the valve housing. The first end of the valve is externally and internally threaded. The external threads are mated with threads presented either by the gun, hose or adaptor, i.e., the recipient of the pressurized air. The external portion of the first end of the valve housing is notched to accommodate a first elastomeric O-ring 56. The first elastomeric O-ring operates as a sealing device when the first end of the valve housing is mated with a gun, hose or adaptor. The hose, gun or adaptor also possesses a pin which when mated with the valve, depresses the poppet releasing the pressurized air.

The outlet port is formed such that it possesses three chambers of increasingly smaller diameters with the chamber of the outlet port closest to the center of the valve having the smallest diameter. A substantially cylindrical poppet retainer 60 is nested in the outlet port by mating threads presented by the poppet retainer with the internal threads of the first end which are located in the portion of the outlet port having the medium sized diameter 52b. The poppet retainer possess a lip 61 that flares outwardly and engages the portion of the outlet port having the largest diameter 52c. The poppet retainer lip is of sufficient size that when the poppet retainer 60 is screwed into the outlet port 52, the lip of the poppet retainer lies flush with the exterior edge of the first end of the valve housing.

A shaped plastic seal 62, preferably made of polytretrafluoroethylene, that is pressure activated and is positioned in the cavity of the outlet port with the mid-sized diameter 52b between the poppet retainer 60 and the molding of the outlet port, such that when the poppet retainer is screwed into the outlet port until it is flush with the outer edge of the first end of the valve housing, the shaped plastic seal is secured between the poppet retainer and the molding of the outlet port where its diameter steps down from the mid-size to the smallest size. Thus, exterior diameter of the shaped plastic seal is mechanically captured. Furthermore, the shaped plastic seal creates a seal between the poppet retainer, the poppet and the portion of the outlet port possessing the smallest diameter 52a.

A poppet 63 having a first and second end is positioned in the outlet port. The poppet has a generally cylindrical shape with a closed first end. The first end of the poppet possesses an external diameter slightly smaller than the interior diameter of the poppet retainer such that it can move along the length of the poppet retainer 60 when the poppet is in the open position. The second end of the poppet flares out to a diameter slightly larger than the interior diameter of the poppet retainer and makes tangential contact with the poppet retainer and the shaped plastic seal. The second end of the poppet further extends into the area of the outlet port having the smallest diameter. Thus, the poppet acts as a gating device for the outlet port.

The application of pressure initiates the flow characteristic of the shaped plastic seal at the interface of the inner diameter of the shaped plastic seal and the outer diameter of the poppet. A relief area between the flared end of the poppet and the smallest diameter of the outlet port allows the shaped plastic seal to extrude the proper amount. This sealing technique has inherent lubricity, is self-healing, is non-temperature sensitive, and is compatible with all noble gases used.

A helical spring 64 also is located in the outlet port. A first end of the helical spring is inserted into the cavity of the poppet 63 and secured to the interior of the first end of the poppet. The helical spring substantially fills the interior poppet cavity and extends beyond the second end of the poppet. The second end of the helical spring is attached to the vertical wall of the outlet port. The helical spring operates to move the poppet to the closed position when the valve is disengaged from the hose, gun or adaptor, thereby preventing migration of particulates and gases into the valve.

The middle section of the valve houses a safety port 54, a safety port cylinder 70, a precision burst disc 71, a nylon ring 72, and a transfer port 53 that connects the outlet port 52 and the input port 51. The safety port is perpendicular to the transfer port. An opening exists in the wall of the middle section of the valve housing. A nylon ring 72 that acts as a retainer lines the opening in the valve housing wall. A cylinder 70 possessing an interior diameter equal to and aligned with the exterior diameter of the safety port, is fitted into the opening and held to securely in the opening in the middle section of the valve by the nylon ring. A precision burst disc 71 having the same diameter as the exterior diameter of the safety port cylinder, is inserted in the opening of the middle section of the valve between the safety port cylinder and the safety port such that it acts as a seal between the interior chamber of the safety port cylinder and the safety port. The precision burst disc is designed to break when the pressure exceeds a set pressure. When the safety port cylinder is positioned in the middle section of the valve housing, it extends out from the exterior surface of the valve housing. The safety port cylinder has a capped first end. A release port 73 that is perpendicular to and intersects the chamber of the safety port cylinder, bisects the safety port cylinder cap and equally distributes pressurized air escaping therefrom into the atmosphere. Thus, when the pressure exceeds a set pressure, the precision burst disc bursts, pressurized air rushes from the safety port into the chamber of the safety port cylinder, and out the release port into the atmosphere.

The valve housing has a second end that has threads, externally and internally within the input port, to engage a pressure source, such as a cartridge or canister, which has a threaded lip that complements the threads presented by the second end of the valve housing. The exterior of the second end of the valve housing is molded slightly such that it possesses a notch that can accommodate a second elastomeric O-ring 57. When the pressure source is screwed into the valve, it engages the second O-ring 57 such that the second O-ring operates as a seal between the pressure source and valve. Thus, the outer diameter of the pneumatic valve is mechanically captured by the pressure source and the hose, gun or adaptor, and the second O-ring.

The second end further possesses a relief port 55 that extends from the atmosphere into the chamber of the valve at the second end. The relief port permits air to escape when the source of pressurized air is disengaged from the valve.

In the normal inoperative state, the helical spring keeps the poppet in its closed position such that the poppet is in sealing engagement with the shaped plastic seal. Pressurized air is trapped in the input and transfer ports. The pin of the hose, gun or adaptor depresses the poppet to move into the open position and the seal between the poppet and shaped plastic seal is broken. Pressurized air travels across the input port and transfer port and into the outlet port where the pressurized air is released into the gun, hose or adaptor.

The combination of the regulator and valve allows proper matching of flow orifices which significantly improves gun performance, i.e., the stream of pressurized air delivered is controlled properly by the channelling of the pressurized air through the regulator and valve chambers.

What is claimed is:

1. A pneumatic pressure regulator comprising:
    a housing having an inlet connectable to a source of pressurized air and an outlet connectable to a device utilizing said pressurized air such that a flow path for said pressurized air is established through said housing between said inlet and said outlet;
    a means for adjusting the amount of air flow through said regulator which is located within said housing such that said air flow adjustment means is movable between at least two positions to vary the amount of said pressurized air flowing within said flow path, said positions comprising:
        (i) a first position in which flow of said pressurized air between said inlet and said outlet is substantially unimpeded by said air flow adjustment means; and
        (ii) a second position in which flow of air between said inlet and said outlet is substantially blocked by a first flexible member which impedes air flow past said air flow adjustment means;
    a means for applying a spring force to said air flow adjustment means located within said housing and configured to mechanically engage said air flow adjustment means to move said air flow adjustment means between said first position and said second position;
    a temperature compensation means located within said housing and in contact with said spring force applying means to counteract changes in said spring force applied to said air flow adjustment means which are caused by variations in ambient temperature;
    a second flexible member which permits mechanical engagement between said temperature compensation means and said air flow adjustment means;
    wherein said temperature compensation means includes an elastic insert material that expands and contracts with variations in ambient temperature to counteract said changes in said spring force applied to said air flow adjustment means in order to minimize said movement of said air flow adjustment means between said first position and said second position so that said air pressure at said outlet is maintained substantially constant with pressure variations at said air source.

2. A pneumatic pressure regulator according to claim 1 wherein said temperature compensation means further comprises:
    a retainer containing said insert and positioned within said flow path proximate to said outlet;
    a second spring in mechanical engagement with said retainer such that said engagement causes the position of said retainer to be adjusted to result in application of said force to said air flow adjustment means to cause said movement of said air flow adjustment means between said first position and said second position;
    wherein the said expansion and contraction of said insert counteracts variations in the spring constant of said second spring caused by variations in ambient temperature such that movement of said retainer is minimized to maintain said position of said air flow adjustment means substantially unchanged such that a substantially constant air pressure is maintained at said outlet.

3. A pneumatic pressure regulator according to claim 2 further comprising an anti-extrusion ring separating said retainer and said insert for containing said insert within said retainer.

4. A pneumatic pressure regulator according to claim 2, further comprising a pressure relief means which includes a third O-ring sealing said air flow adjustment means from atmosphere, wherein said seal is removed by said engagement of said retainer and said second spring to move said air flow adjustment means to said second position when a predetermined pressure is exceeded.

5. A pneumatic pressure regulator according to claim 2 wherein said air flow adjustment means comprises:
 a movable regulator poppet in mechanical engagement with said retainer to allow movement of said air flow adjustment means between said first position and said second position;
 a regulator seat fixed within said inlet and being engageable with said poppet such that said air flow is blocked when said air flow adjustment means is in said second position;
 a poppet guide located within said inlet and forming a channel for movement of said regulator poppet;
 a first spring cooperating with said poppet for sealing said poppet against said regulator seat when said air flow adjustment means is in said second position.

6. A pneumatic pressure regulator according to claim 5 wherein said air flow adjustment means further comprises:
 a first O-ring located within said channel and in sliding engagement with said poppet;
 wherein said poppet has at least one set of ports; and
 wherein pressure variations at said air source causes movement of said poppet such as to permit said at least one poppet port to pass air flow around said first O-ring such that a differential pressure is maintained across said regulator seat to force said first spring to maintain said poppet in said second position to substantially block passage of air from said inlet to said outlet in order to maintain a substantially constant air pressure at said outlet.

7. A pneumatic pressure regulator according to claim 5, wherein said first flexible member is located at said regulator seat to form said seal with said poppet when said air flow adjustment means is in said second position.

8. A pneumatic pressure regulator according to claim 7, wherein said first flexible member is comprised of a fourth O-ring.

9. A pneumatic pressure regulator according to claim 5, wherein said second flexible member is located nearest to the end of said retainer opposite said insert.

10. A pneumatic pressure regulator according to claim 9, wherein said second flexible member is comprised of a fifth O-ring.

11. A pneumatic pressure regulator according to claim 1, wherein said regulator is connected to a pressurized air system comprising a gun and a valve for providing pressurized air from said regulator to said gun, wherein said valve comprises:
 a housing which is formed to provide an inlet having a connection adapted for sealing engagement with a mating connection of said regulator and an outlet having a connection adapted for sealing engagement with a mating connection of said gun to said supply said pressurized air to said gun;
 a poppet located within said outlet and in movable engagement with an air receiving means located within said gun to allow air to pass from said pressure source to said air receiving means through said mating connection;
 a plastic seal with a first surface in engagement with said poppet and a second surface fixing said seal within said outlet;
 a spring in cooperation with said poppet to bias said poppet against said seal first surface to prevent pressurized air from entering said outlet before said sealing engagement is established by said mating connection;
 wherein said poppet moves to engage said air receiving means to permit release of pressurized air to said gun when said sealing engagement is established by said mating connection.

12. A valve as set forth in claim 11 further comprising a safety cylinder and a burst disc attached to said inlet, wherein said burst disc is inserted and forms a seal between said inlet and said safety cylinder, and said disc bursts to release pressurized air from said inlet to said safety cylinder when a predetermined air pressure is exceeded.

13. A pressurized air gun system having a pneumatic pressure regulator comprising:
 a housing having an inlet connectable to a source of pressurized air and an outlet connectable to a device utilizing said pressurized air such that a flow path for said pressurized air is established through said housing between said inlet and said outlet;
 a means for adjusting the amount of air flow through said regulator which is located within said housing such that said air flow adjustment means is movable between at least two positions to vary the amount of said pressurized air flowing within said flow path, said positions comprising:
   (i) a first position in which flow of said pressurized air between said inlet and said outlet is substantially unimpeded by said air flow adjustment means; and
   (ii) a second position in which flow of air between said inlet and said outlet is substantially blocked by a first flexible member which impedes air flow past said air flow adjustment means;
 a means for applying a spring force to said air flow adjustment means located within said housing and configured to mechanically engage said air flow adjustment means to move said air flow adjustment means between said first position and said second position;
 a temperature compensation means located within said housing and in contact with said spring force applying means to counteract changes in said spring force applied to said air flow adjustment means which are caused by variations in ambient temperature;
 a second flexible member which permits mechanical engagement between said temperature compensation means and said air flow adjustment means;
 wherein said temperature compensation means includes an elastic insert material that expands and contracts with variations in ambient temperature to counteract said changes in said spring force applied to said air flow adjustment means in order to minimize said movement of said air flow adjustment means between said first position and said second position so that said air pressure at said outlet is maintained substantially constant with pressure variations at said air source.

14. A pressurized air gun system according to claim 13, wherein said temperature compensation means further comprises:
- a retainer containing said insert and positioned within said flow path proximate to said outlet;
- a second spring in mechanical engagement with said retainer such that said engagement causes the position of said retainer to be adjusted to result in application of said force to said air flow adjustment means to cause said movement of said air flow adjustment means between said first position and said second position;
- wherein the said expansion and contraction of said insert counteracts variations in the spring constant of said second spring caused by variations in ambient temperature such that movement of said retainer is minimized to maintain said position of said air flow adjustment means substantially unchanged such that a substantially constant air pressure is maintained at said outlet.

15. A pressurized air gun system according to claim 14, further comprising a pressure relief means which includes a third O-ring sealing said air flow adjustment means from atmosphere, wherein said seal is removed by said engagement of said retainer and said second spring to move said air flow adjustment means to said second position when a predetermined pressure is exceeded.

16. A pressurized air gun system according to claim 14, wherein said air flow adjustment means comprises:
- a movable regulator poppet in mechanical engagement with said retainer to allow movement of said air flow adjustment means between said first position and said second position;
- a regulator seat fixed within said inlet and being engageable with said poppet such that said air flow is blocked when said air flow adjustment means is in said second position;
- a poppet guide located within said inlet and forming a channel for movement of said regulator poppet;
- a first spring cooperating with said poppet for sealing said poppet against said regulator seat when said air flow adjustment means is in said second position.

17. A pressurized air gun system according to claim 16 wherein said air flow adjustment means further comprises:
- a first O-ring located within said channel and in sliding engagement with said poppet;
- wherein said poppet has at least one set of ports; and
- wherein pressure variations at said air source causes movement of said poppet such as to permit said at least one poppet port to pass air flow around said first O-ring such that a differential pressure is maintained across said regulator seat to force said first spring to maintain said poppet in said second position to substantially block passage of air from said inlet to said outlet in order to maintain a substantially constant air pressure at said outlet.

18. A pressurized air gun system according to claim 16, wherein said first flexible member is located at said regulator seat to form said seal with said poppet when said air flow adjustment means is in said second position.

19. A pressurized air gun system according to claim 18, wherein said first flexible member is comprised of a fourth O-ring.

20. A pressurized air gun system according to claim 16, wherein said second flexible member is located nearest to the end of said retainer opposite said insert.

21. A pressurized air gun system according to claim 20, wherein said second flexible member is comprised of a fifth O-ring.

* * * * *